E. JOHNSON & W. E. BYBEE.
DIRECTION INDICATOR FOR MOTOR VEHICLES.
APPLICATION FILED NOV. 8, 1916.
1,252,700.
Patented Jan. 8, 1918.
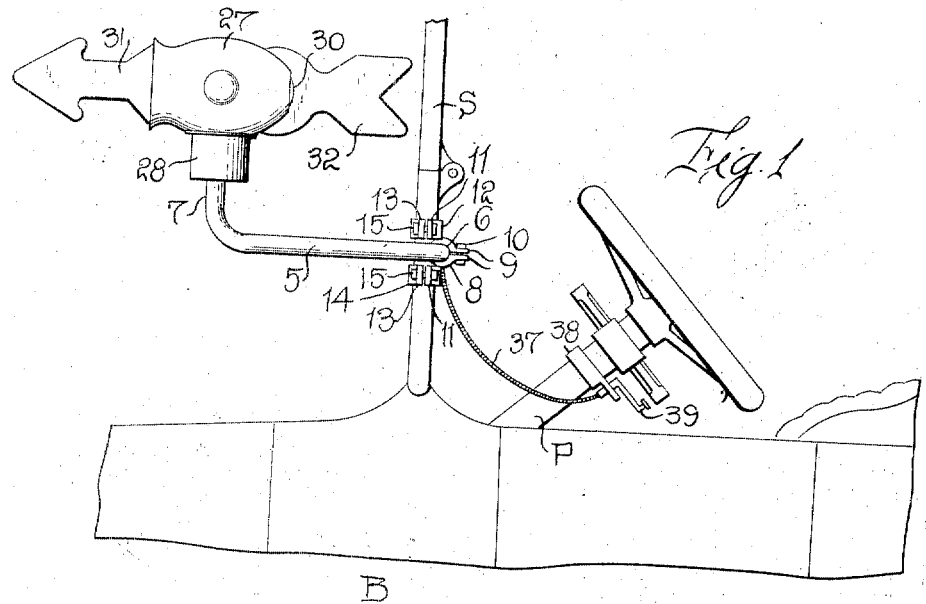
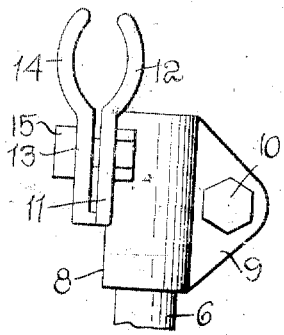
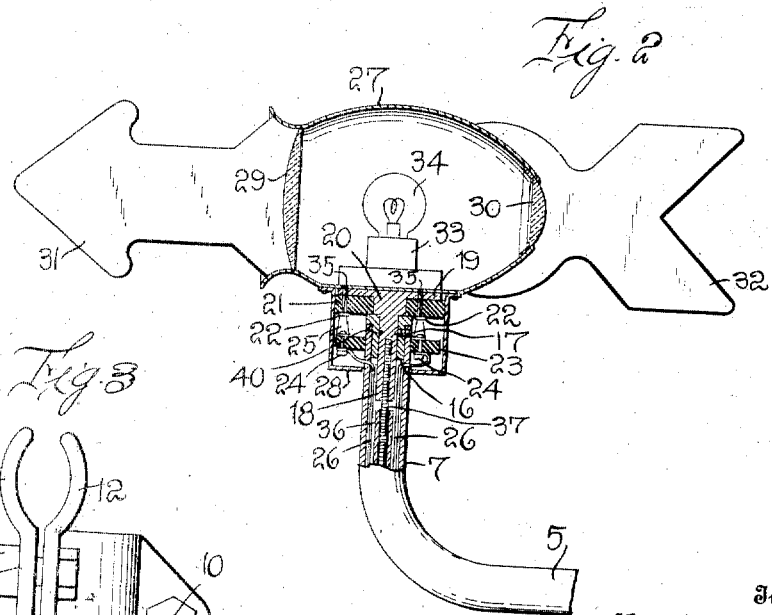
Inventors
E. JOHNSON
W. E. BYBEE
By Watson E. Coleman
Attorney

UNITED STATES PATENT OFFICE.

ELMO JOHNSON AND WILLIAM E. BYBEE, OF QUINCY, ILLINOIS.

DIRECTION-INDICATOR FOR MOTOR-VEHICLES.

1,252,700.      Specification of Letters Patent.      Patented Jan. 8, 1918.

Application filed November 8, 1916. Serial No. 130,233.

*To all whom it may concern:*

Be it known that we, ELMO JOHNSON and WILLIAM E. BYBEE, citizens of the United States, residing at Quincy, in the county of Adams and State of Illinois, have invented certain new and useful Improvements in Direction-Indicators for Motor-Vehicles, of which the following is a specification, reference being had to the accompanying drawings.

This invention relates to an improved direction indicator for motor vehicles and has for its primary object to provide a very simple and easily operated device which may be readily mounted upon the windshield of an automobile and operated from the steering post or other convenient point, whereby other motorists and pedestrians may be advised of the operator's intentions relative to the movement of the vehicle.

It is another and more particular object of our invention to provide a hollow tube or arm and means for securely clamping the same at one of its ends upon the frame of the windshield, an indicating arrow rotatably mounted upon the other end of said hollow arm and provided with a hollow body portion, a flexible shaft extending through the arm and operatively connected to the arrow, said arrow body having a lens mounted therein, means for illuminating the arrow, and means on the steering post for actuating the flexible shaft.

It is a further general object of our invention to provide a device for the above purpose, which is exceedingly simple in its construction, strong and durable, and highly serviceable and convenient for the purpose in view.

With the above and other objects in view, our invention consists in the novel features of construction, combination and arrangement of parts to be hereinafter more fully described, claimed and illustrated in the accompanying drawing, in which, Figure 1 is a side elevation of our improved direction indicator, showing the same applied to the vehicle;

Fig. 2 is an enlarged vertical section through the indicator; and

Fig. 3 is a top plan view of the clamp for mounting the device upon the windshield frame.

Referring in detail to the drawing, B indicates the body of the motor-vehicle and S the windshield frame which is mounted thereon in any usual or approved manner. Our improved direction indicator is applied to the frame of the windshield below the pivotal joint between the upper and lower sections thereof, and includes a tubular rod or arm 5 having one of its ends bent at right angles, as at 6, and its other end angularly bent, as at 7, in a direction at right angles to the end 6 of said arm. This end portion 6 of the arm is removably secured or held in a clamp consisting of a substantially cylindrical body portion 8 which is longitudinally split along one side and formed with the laterally projecting ears 9 apertured to receive a clamping bolt 10. Upon the opposite sides of the body 8 of the clamp, projecting at right angles to the ears 9, a clamping arm is integrally formed, each of said clamping arms having a curved end portion 12 projecting beyond one end of the body 8 and being provided with a bolt receiving opening. A detachable clamping arm or plate 13 also having a curved end portion 14, is adapted to be arranged in opposed relation to each of the clamping arms 11, each of said plates 13 being likewise provided with an opening. Through the coinciding openings in the plates 11 and 13, clamping bolts 15 are disposed. These clamping bolts, as well as the bolt 10, are of course provided with suitable nuts threaded upon one of their ends. The curved portions 12 of the arms 11 are adapted for engagement upon one side of the vertical portion of the windshield frame and the corresponding ends of the plates 13 on the opposite side of the frame. By then tightening the bolts 12, the tubular arm 5 may be securely held in place upon the windshield frame, said arm in turn being tightly clamped within the split body 8.

In the upper open end of the vertical portion 7 of the arm 5, a bushing 16 is secured by means of a set screw 17. A standard 18 is rotatably mounted in the bore of said bushing and is provided upon its upper end with a head plate 19 and an annular flange 20, immediately below this head plate, which rests upon the upper end of the bushing 16. A fiber disk 21 is secured to the under side of the plate 19, and upon the bottom face of this disk opposed metal ring sections 22 are fixed.

A fiber disk 23 is also secured upon the arm 7 below and in spaced relation to the disk 21 and binding posts 24 are mounted in this disk at diametrically opposite points. Contact springs 25 are fixed upon the upper face of the disk by these binding posts and bear at their free ends against the metal ring sections 22. The wires 26, connected in a suitable circuit, are extended through the tubular arm 5 and connected to the respective binding posts 24.

Upon the plate 19, a hollow sheet metal body 27 is secured, said body being preferably of semi-elliptical form and having a sheet metal casing or housing 28 fixed to its bottom wall and depending therefrom, said casing inclosing the fiber disks 21 and 23 and the circuit closing means. In one end of the hollow body 27, a large lens 29 is suitably secured, and a relatively small lens 30 is likewise secured in the other end of said body. The point 31 of an arrow is suitably fixed in the first named end of the body 27 in bisecting relation to the lens 29, and a tail piece 32 of any suitable form is secured to the opposite end of the body 27, exteriorly thereof, and projects in a longitudinal direction from the same. Within the body 27, a suitable socket 33 is fixed to the post thereof in which the incandescent lamp 34 is disposed. Wires 35 extend from the lamp through coinciding openings in the plate 19 and the disk 21 and are connected to the metal ring sections 22.

A metal tube 36 extends through the hollow arm 5 and is suitably secured to the terminal of the end portion 6 of said arm. The other end of this tube terminates within the vertically disposed portion 7 of the arm contiguous to the lower end of the standard 18. A flexible shaft 37 extends through the tube 36 and has one of its ends suitably secured within the bored lower end of the standard 18. This flexible shaft extends through the end 6 of the hollow arm and is mounted in a suitable bracket element indicated at 38, which is fixed upon the steering post P of the vehicle. The flexible shaft may be manually actuated by any desired means such, for instance, as a crank 39.

The inner end of the set screw 17 which secures the bushing in the upper end of the hollow arm, is reduced and loosely engaged in an annular groove indicated at 40, provided in the periphery of the rotatable standard 18. Thus, this set screw also effectually prevents upward vertical movement of the indicating arrow with respect to the supporting arm.

From the foregoing description, taken in connection with the accompanying drawing, the construction, manner of operation and several advantages of my invention will be clearly and fully understood. When the circuit for the lamp 34 is closed, said lamp will, of course, be illuminated and the light rays will be disseminated through the lens up upon the arrow point 31, and also through the lens 30 upon the tail portion of the arrow. The driver of the vehicle, by rotating the crank 39, imparts rotation to the standard 18 to which the flexible shaft 37 is connected, and thereby rotates the arrow mounted upon the arm 6 in a direction corresponding to the direction in which he intends to turn the vehicle. The springs 25 maintaining their contact with the metal conducting ring 22, prevent any break in the illuminating circuit for the indicating arrow. Thus, other motorists or pedestrians may at once see in which direction the approaching vehicle will turn and, being thus advised, can avoid collision and possible injury. The device as a whole consists of relatively few simply constructed elements and, by the provision of our improved mounting for the indicator, it may be readily attached to the windshield frame of the ordinary motor vehicle. While we have referred to the operating means for the flexible shaft as being mounted upon the steering post, it is manifest, of course, that this operating means may be arranged at any desired location on the vehicle body.

While we have shown and described the preferred construction and arrangement of the several elements, it is to be understood that the device is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is—

1. An indicator for motor vehicles including a tubular arm, a rotatable indicating member, a standard fixed to said member and rotatably mounted in one end of the arm, a housing fixed to the indicating member and completely closing said standard and the upper end of the tubular arm, and a flexible operating shaft extending through the tubular arm and directly connected to said standard.

2. A direction indicator for motor vehicles including a tubular supporting arm, a rotatable indicating member, a standard fixed to the base of said member, a bushing secured in the upper end of said arm within which said standard is engaged, a housing fixed to the indicating member and inclosing the upper end of the tubular arm, and operating means for the indicating member extending through said tubular arm and directly connected to said standard.

3. A direction indicator for motor vehicles including a tubular supporting arm, a rotatable indicating member, a bushing engaged in the upper end of said arm, a standard fixed to the base of the indicating member and rotatably mounted in said bushing, a retaining screw having threaded engagement in the arm and the bushing, said standard being provided with a circumferential groove to receive the inner end of the screw, and a flexible operating shaft extending through the tubular arm and directly connected at one of its ends to said standard.

In testimony whereof we hereunto affix our signatures in the presence of two witnesses.

ELMO JOHNSON.
WILLIAM E. BYBEE.

Witnesses:
JOHN MILDEN,
BERT J. GOODAPPLE.